Patented Nov. 11, 1952

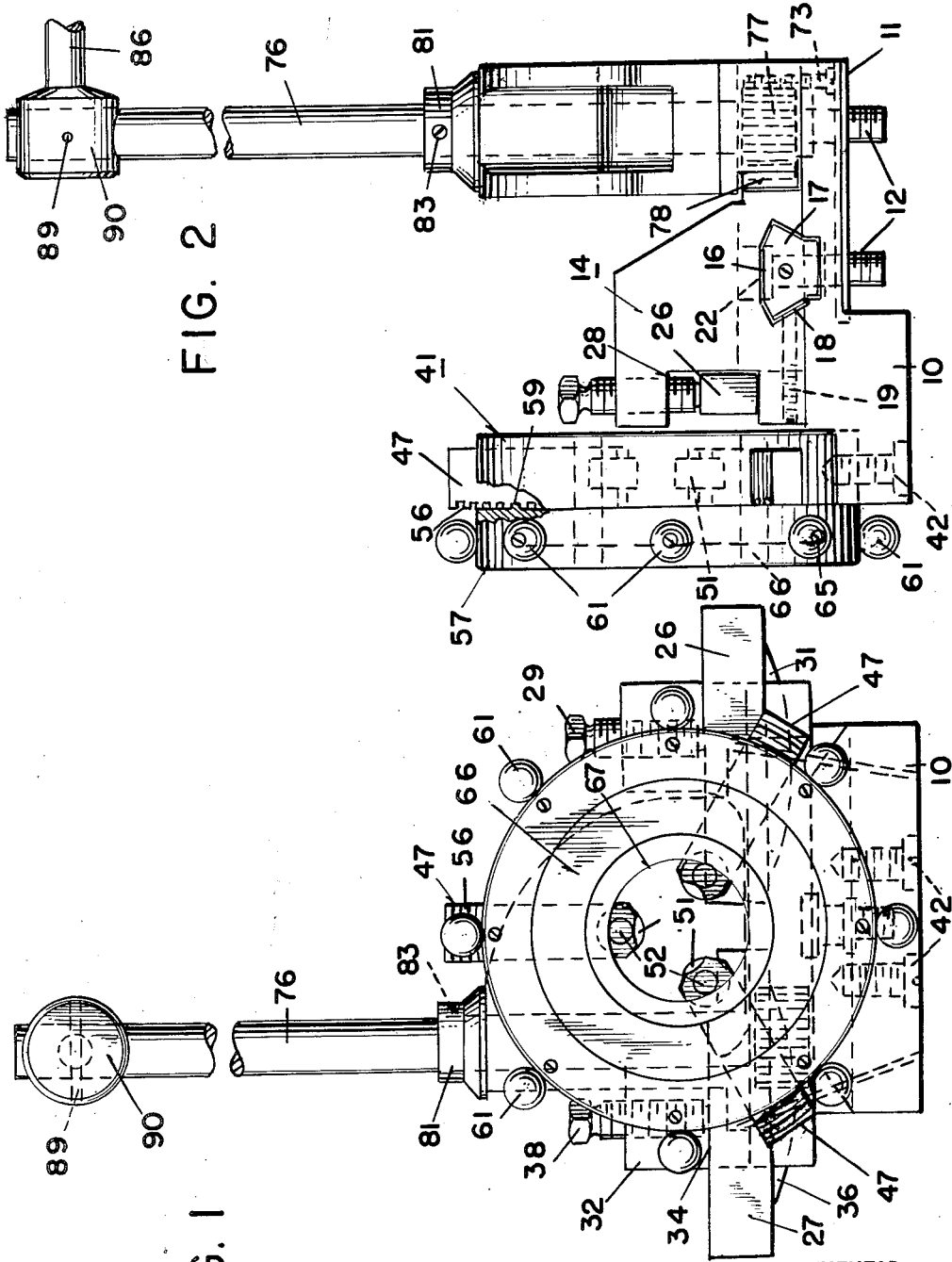

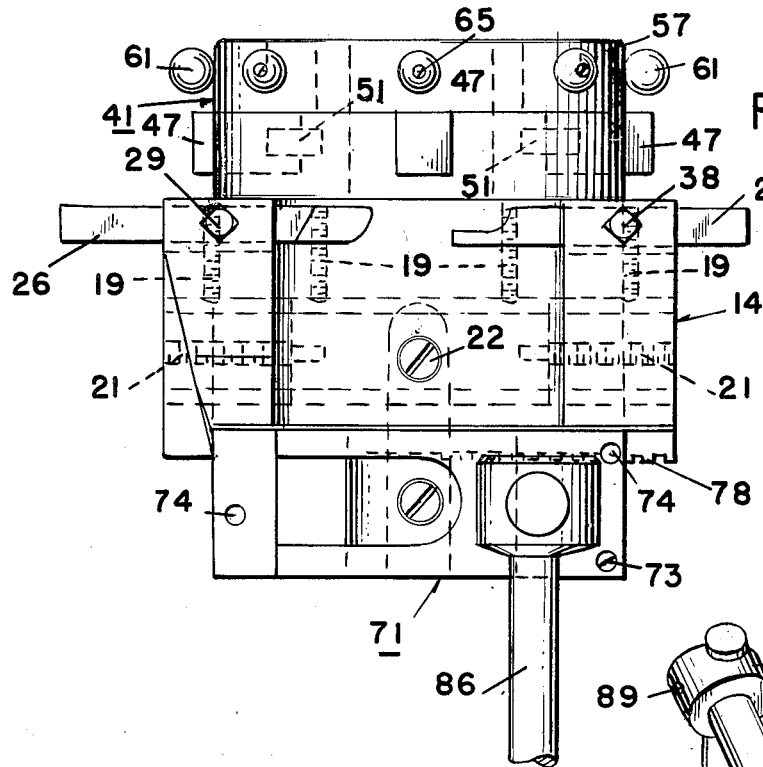
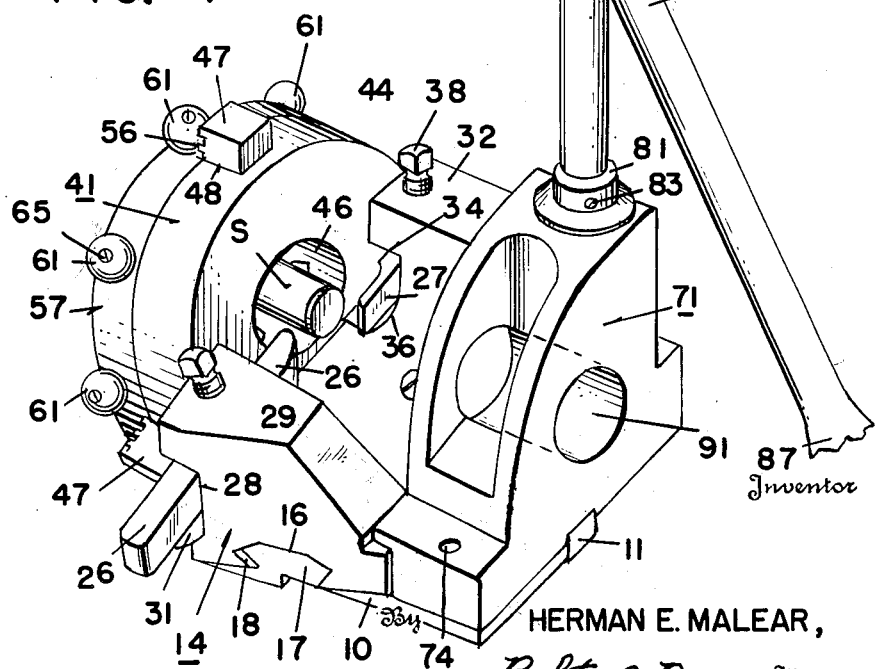

2,617,322

UNITED STATES PATENT OFFICE 2,617,322

TURRET LATHE ATTACHMENT

Herman E. Malear, Cleburne, Tex.

Application October 30, 1947, Serial No. 782,976

3 Claims. (Cl. 82—25)

The present invention relates to a device for use in association with a lathe or like machine providing a support for an elongated article while it is being machined or cut, including tool posts in combination with the support for machining or cutting the elongated stock. The invention more specifically pertains to a device which may be regarded as a self-centering rest or support for stock combined with a tool post and adaptable to a lathe of conventional construction.

An object of the invention is to provide a tool post assembly which may be mounted on the turret of a lathe or the like whereby various types of tools may be secured therein and moved relative to the material which is to be machined including in combination therewith a support for the material or stock being machined, plus the feature of adjustment of the support for the stock.

A still further object of the invention is to provide a combined self-centering steadying rest and tool post wherein radial arms are employed to support the stock and which may be conveniently adjusted to accommodate elongated articles of different diameters, and a device for supporting tool bits which may be moved relative to the stock to carry out a machining or cutting operation.

Other objects and features of the invention pertain to the organization and the structural elements as hereinafter described in detail and further objects and features of the invention will be more apparent as the present disclosure proceeds and upon consideration of the annexed drawings wherein a typical embodiment of the invention is disclosed.

In the drawings:

Fig. 1 is an end elevational view of a stock support and tool post assembly embodying the invention.

Fig. 2 is a side elevational view with parts broken away to illustrate features of the adjustable jaws.

Fig. 3 is a plan view.

Fig. 4 is a perspective view of the device.

The invention is directed to an accessory or attachment for a lathe or similar machine and relates to a device for cutting or machining elongated round material or stock which is usually of such small diameter as to be relatively unstable at the free end portion thereof. It often happens in machining or cutting small rods or staffs that the cutting operation must be performed at a point spaced from the chuck of a lathe. The attachment hereinafter described provides means for steadying or supporting the elongated stock immediately adjacent the point or area where the tool bit is adapted to engage the material to be machined or cut. The device includes means for holding tools adjacent the steadying or supporting means and at the same time permits adjustment or manipulation of the tool bit employed in the machining or cutting operation.

Referring to the drawings, there is shown at 10 a base on which other parts of the assembly are mounted and secured thereon. The base 10 is provided with a tongue 11 arranged lengthwise of the under-face thereof. This tongue is adapted to fit into a groove provided on the turret of a lathe. The base 10 and the entire assembly is adapted to be secured in a fixed manner on the turret of a lathe by means of a plurality of anchor bolts 12, shown in Fig. 2. The tongue 11 is adapted to fit snugly in one of the conventional grooves customarily provided in the turret of a lathe. Accordingly, the base 10 may be maintained in an adjustable but fixed relationship with the machine.

A carriage shown generally at 14 is mounted for movement relative to the base 10. This carriage 14 is adapted to slide transversely of the device and is maintained in fixed association therewith during such sliding movement by means of a prism shaped groove 16. A tongue 17 is provided on the base 10 for guiding and retaining the carriage in cooperative association with the remainder of the device. A gib 18 is provided along one face of the groove 16 to enable adjustment of the space between the tongue 17 and the groove 16. The gib 18 is adjustably secured in position by means of a plurality of screws 19. The carriage 14 is, therefore, free to be moved in a sliding movement on the tongue 17 transversely of the axis of the lathe. Such transverse movement of the carriage is, however, limited by means of adjustable stop pins 21 and these adjustable screws are adapted to be engaged by a stop member 22 which depends from the carriage 14 to a position below the adjustable screws 21. Accordingly, transverse movement of the carriage 14 is limited by the adjustable stop pins or screws 21.

The carriage 14 provides means for supporting one or more tools which may be employed in machining or cutting the stock which is to be machined. A round and elongated piece of stock is shown at S in Fig. 4 and exemplary types of tools are illustrated at 26 and 27. The carriage 14 is provided with an opening at 28 for receiving the shank portion of the tool 26. It will be appreciated that any type of tool bit may be substituted for that shown at 26. This tool may be held in any suitably adjusted position in the opening 28 by means of tool post screw 29. The opening 28 is also provided with an adjustable rocker 31 which permits vertical and angular adjustment of the tool 26 relative to the carriage 14. The tool 27 is supported in a similar manner in a tool post portion 32 of the carriage and arranged at the opposite side of the axis of the lathe. This tool post portion 32 of the carriage 14 is provided with an opening 34 through which the rear end portion of the tool 27 extends. A rocker 36 is also arranged in this opening to permit angular and vertical adjustment of the tool 27 relative to the tool post portion 32. The tool 27 may be maintained in the adjusted position by means of a tool post screw 38.

It will be observed that the tools 26 and 27 or other suitable machining or cutting implements may be employed in association with the tool post portions of the carriage and the operative ends of these tools are, therefore, in proper position adjacent the end of the stock S which is to be machined or cut. The carriage 14 is slidable transversely of the axis of the stock so that either of the tools 26 or 27 may be moved into engagement or operative association with the material which is to be machined.

The device includes a support or steadying rest for the stock S adjacent the portion which is to be machined by the inner ends of the tool bits 26 or 27. This supporting means is indicated generally at 41 in the drawings, and this assembly is rigidly mounted on the base 10 by means of a plurality of round head machine bolts 42. The part 44 of the support is accordingly mounted in a stationary and fixed position on the base 10. This part 44 is generally disc-shaped and has a cylindrical peripheral portion and a relatively large opening 46 in the center thereof through which the stock S is adapted to extend.

A plurality of radially arranged jaws 47 are mounted for radial movement on the stationary member 44. These jaws are adapted to be received in radially arranged grooves, one of which is shown at 48 in Fig. 4. These jaws 47 are equally spaced about the circumference of the support and are preferably circumferentially spaced by approximately one hundred twenty degrees. In one embodiment, two of the three jaws are arranged below the axis of the device so as to provide a more adequate support for the stock extending into the opening 46. The inner ends of the jaws 47 are each provided with a roller 51. These rollers are secured by means of pins or stub shafts 52 to forked-like ends at the inner portion of the jaws 47. In one embodiment, the pins 52 may be tapered to provide bearing surfaces for the rollers 51. These rollers are provided for the purpose of engaging the periphery of the stock S and accordingly reducing the friction between the inner ends of the jaws and the rotating stock.

The device includes means for adjusting the radial position of the jaws 47 and these jaws carry teeth 56 along one face thereof, as shown particularly in Fig. 2. A scroll member 57 is mounted in axial alignment with the stationary part 44 and desirably of the same diameter so that the peripheries thereof are also in alignment. This scroll member 57 is rotatable relative to the member 44 and carries spiral threads 59 (Fig. 2) on an end face thereof which is adapted to engage the teeth 56 of all of the jaws 47. Accordingly, as the scroll member 57 is rotated, the jaws 47 are concomitantly moved radially inwardly or outward depending upon the direction of the rotation of the scroll member 57 relative to the stationary part 44. To facilitate convenient rotation of the scroll member, the periphery thereof is provided with a plurality of knobs 61. These knobs may be attached to the scroll member in any suitable manner, such as by means of screws 65.

The scroll member is retained in operative association with the body portion 44 by means of a retainer ring 66 which carries threads (not shown) on its inner diameter which engage threads on a boss of the stationary body part 44. Any suitable or convenient means may be provided for the purpose of maintaining the scroll member 56 in position relative to the stationary part of the adjustable stock support. The retaining member 66 and the scroll member are both provided with an opening 67 co-extensive with that of the opening 46 so that the stock may be introduced through this end of the device to a position to be supported by the inner ends of the jaws 47 and steadied during the cutting or machining operation by either of the tools 26 or 27.

The opposite end of the base 10 supports means for adjusting the position of the tools 26 or 27 relative to the stock. Such adjusting means includes a mechanism for moving the carriage 14 transversely of the axis of the device so as to move these tools in relation to the stock S. The carriage manipulating means includes an end member 71 mounted on the base 10 by means of a plurality of round head screws 73 and a plurality of dowel pins 74. A vertically arranged shaft 76 is mounted for rotation in the member 71 and carries a pinion gear 77 at the lower end thereof. This pinion gear 77 is adapted to mesh with teeth 78 of a rack gear, carried by the carriage 14. Thus, upon rotation of the shaft 76 and the pinion gear 77, the carriage 14 will be shifted transversely of the base and guided on the tongue 17.

The shaft 76 may be adjusted vertically to a position for proper meshing of the gear 77 with the teeth 78 of the rack gear. The shaft 76 may be maintained in the adjusted position by means of a collar 81, secured to the shaft 76 by means of a screw 83. A handle 86 carrying a suitable knob 87 at the end thereof is attached to the upper end of the shaft 76. This handle 86 may be secured to the shaft 76 by means of a pin 89 which extends through a ferrule 90 and the shaft 76. The shaft 76 may be conveniently rotated by swinging the handle 86 to move the carriage on the base 10 and thereby shift either of the tools into engagement with the rotating stock.

In operation, the device is attached to the turret of a lathe by inserting the tongue 11 in one of the slots of the turret. Thereafter, the device may be maintained in a fixed position on the turret by means of bolts 12. The device may be moved over the end of the stock carried in the chuck of a lathe by first retracting the jaws 47 so that the opening between the inner ends is sufficient to receive the stock. Thereafter, the scroll member 57 is rotated by grasping the knobs 61, whereupon the jaws 47 are moved radially inward so that the rollers 51 engage the periphery of the rod, shaft or tube which forms the stock. In this connection, it is desirable that the inner ends of the jaws or rollers 51 engage the stock with sufficient pressure to provide a firm support for the end portion remote from the chuck of the lathe. The stock accordingly, is prevented from wobbling or vibrating during rotation and particularly when engaged by one of the tools 26 or 27.

Thereafter, a tool which is to be employed in the machining or cutting operation is introduced in the opening 28 or the opening 34, after which the associated tool post screw is tightened after the rocker thereof has been properly adjusted. The handle 86 is then manually swung to rotate the shaft 73. The pinion gear 77 is, accordingly, rotated and, meshing with the teeth 78 of the rack gear, will thereby shift the carriage 14 and the tool holder carrying the tool into engagement with the rotating stock S. It will be observed that the member 71 is provided with a rather large opening 91 through which the stock may extend. Reversed rotation of the handle 86 will retract the tool from an operative position relative to the stock after which another tool or the one mounted in the opposite tool post may be employed in a further machining or cutting operation. The turret of the lathe may be moved in the conventional manner to arrange the combined stock support and tool holder assembly at another position along the stock.

While the invention has been described with reference to specific structural features, it is apparent that changes may be made in a number of the details and in the general organization. Such modifications and others may be made without departing from the spirit and scope of the invention as set forth in the appended claims.

What I claim and desire to secure by Letters Patent is:

1. An attachment for a turret lathe, a plate shaped horizontally disposed base member, a tongue carried by the base member projecting from an under surface thereof and extending longitudinally of the base member, said tongue being adapted to fit in a groove in the turret of a lathe, anchor bolts carried by the base member projecting downwardly therefrom for securing the base member to the turret, a dovetail upstanding tongue carried by an upper surface of the base member arranged transversely thereto, a carriage having a dove-tail groove therein receiving the second tongue so that the carriage may be moved transversely of the base member, oppositely projecting adjustable stop pins mounted on the base member under the carriage, a stop member on the carriage between said pins adapted to engage said stop pins and limit movement of the carriage transversely of the base member, a tool post element integral with the carriage and extending upwardly from one side thereof, said tool post having a slot in an end thereof for receiving a tool, a second tool post element integral with the carriage and extending upwardly from the other side thereof, said second tool post having a slot in an end thereof aligned with the first slot transversely of the attachment for receiving an oppositely disposed tool, said carriage being unobstructed between the tool post elements to provide a space for stock to be operated on by said tools, a lip integral with the carriage extending transversely thereof along an end of the carriage adjacent the base, rack gear teeth along an edge of said lip arranged substantially parallel with the groove in the carriage, an end member secured to the base member having a flange overlying said lip and said rack gear teeth, and a pinion gear journalled within the end member meshing with said rack gear teeth under said flange.

2. An attachment for a turret lathe, a plate shaped horizontally disposed base member, means on the base member projecting downwardly therefrom for securing the base member to the turret, an upstanding tongue on the upper surface of the base member arranged transversely thereto, a carriage having a groove therein for receiving the tongue for guiding the carriage transversely of the base member, a tool post element extending upwardly from one side of the carriage, said tool post having a slot in an end thereof for receiving a tool, a second tool post element extending upwardly from the other side of the carriage, said second tool post having a slot in an end thereof for receiving an oppositely disposed tool, the upper surface of said carriage between the tool post elements providing a space for stock to be operated on by said tools, a lip forming an end of the carriage adjacent the base, rack gear teeth carried by a free edge of said lip arranged substantially parallel with the groove in the carriage, an end member secured to the base member having a flange overlying said lip and said rack gear teeth, a pinion gear journalled within the end member meshing with said rack gear teeth, and a vertically disposed shaft journalled in the end member for driving said pinion.

3. An attachment for a turret lathe, a plate shaped base member, means carried by the base member for securing the base member to the turret, an upstanding tongue carried by an upper surface of the base member arranged transversely thereto, a carriage having a groove therein for receiving the tongue for guiding the carriage transversely of the base member, stop pins mounted on the base member under the carriage, a stop member on the carriage between said pins adapted to engage said stop pins and limit movement of the carriage transversely of the base member, a tool post element extending upwardly from one side of the carriage, said tool post having a slot in an edge thereof for receiving a tool, a second tool post element extending upwardly from the other side of the carriage, said second tool post having a slot in the edge thereof for receiving an oppositely disposed tool, said carriage having a substantially flat upper surface between the tool post elements in a horizontal plane below normal position of the tools to provide a space for stock to be operated on by said tools, a lip forming an end of the carriage extending transversely thereof adjacent the base, rack gear teeth along an edge of said lip, an end member secured to the base member having a flange overlying said lip and said rack gear teeth, a pinion gear meshing with said rack gear teeth, a vertically disposed shaft for driving said pinion, a bearing carried by the end member for supporting the vertical shaft for rotation, and said end member having a horizontally disposed opening through which the stock may extend.

HERMAN E. MALEAR.

REFERENCES CITED

The following references are of record in the file of this patent:

UNITED STATES PATENTS

| Number | Name | Date |
| --- | --- | --- |
| 84,410 | Campbell | Nov. 24, 1868 |
| 156,107 | Stone | Oct. 20, 1874 |
| 967,201 | Key | Aug. 16, 1910 |
| 1,000,011 | Johnson et al. | Aug. 8, 1911 |
| 1,228,570 | Kupp | June 5, 1917 |
| 2,174,860 | Montgomery et al. | Oct. 3, 1939 |